United States Patent [19]

Lamort

[11] Patent Number: 4,915,821

[45] Date of Patent: Apr. 10, 1990

[54] APPARATUS FOR TREATMENT OF OLD PRINTED PAPERS WITH SHORT AND LONG FIBER SEPARATION

[75] Inventor: Jean P. Lamort, Virty Le Francois, France

[73] Assignee: E & M Lamort, Vitry Le Francois, France

[21] Appl. No.: 97,566

[22] Filed: Sep. 15, 1987

[30] Foreign Application Priority Data

Sep. 15, 1986 [FR] France .................................. 86 12856

[51] Int. Cl.⁴ ............................................... D21C 5/02
[52] U.S. Cl. ........................................ 209/17; 162/4; 162/55; 162/190; 162/264
[58] Field of Search ................. 162/4, 5, 55, 190, 264; 209/3, 17

[56] References Cited

U.S. PATENT DOCUMENTS

| | | | |
|---|---|---|---|
| 3,354,028 | 11/1967 | Illingworth et al. | 162/5 |
| 3,957,572 | 5/1976 | ErikssonHolz | 162/4 |
| 4,167,438 | 9/1979 | Holz | 162/4 |
| 4,332,638 | 1/1982 | Mauer | 162/5 |
| 4,360,402 | 11/1982 | Ortner et al. | 162/5 |
| 4,780,179 | 10/1988 | Clement | 162/5 |

FOREIGN PATENT DOCUMENTS

| | | | |
|---|---|---|---|
| 172118 | 2/1986 | European Pat. Off. | 162/4 |
| 2311674 | 9/1974 | Fed. Rep. of Germany | 162/5 |
| 2803804 | 10/1978 | Fed. Rep. of Germany | 162/5 |
| 3144561 | 5/1983 | Fed. Rep. of Germany | 162/4 |

*Primary Examiner*—Karen M. Hastings
*Attorney, Agent, or Firm*—Darby & Darby

[57] ABSTRACT

Apparatus for treating of old printed papers includes a recycling conduit for the thickening waters of a long fiber fraction upstream of the fractionation apparatus to the pulping and pre-purification apparatus, and a reservoir for the recovery of thickening waters of a short fiber fraction and of thickening/washing waters of the long fiber fraction. This reservoir is fed with clean water for starting the installation and is connected with a second reservoir such that overflow from the first reservoir empties into the second reservoir.

3 Claims, 1 Drawing Sheet

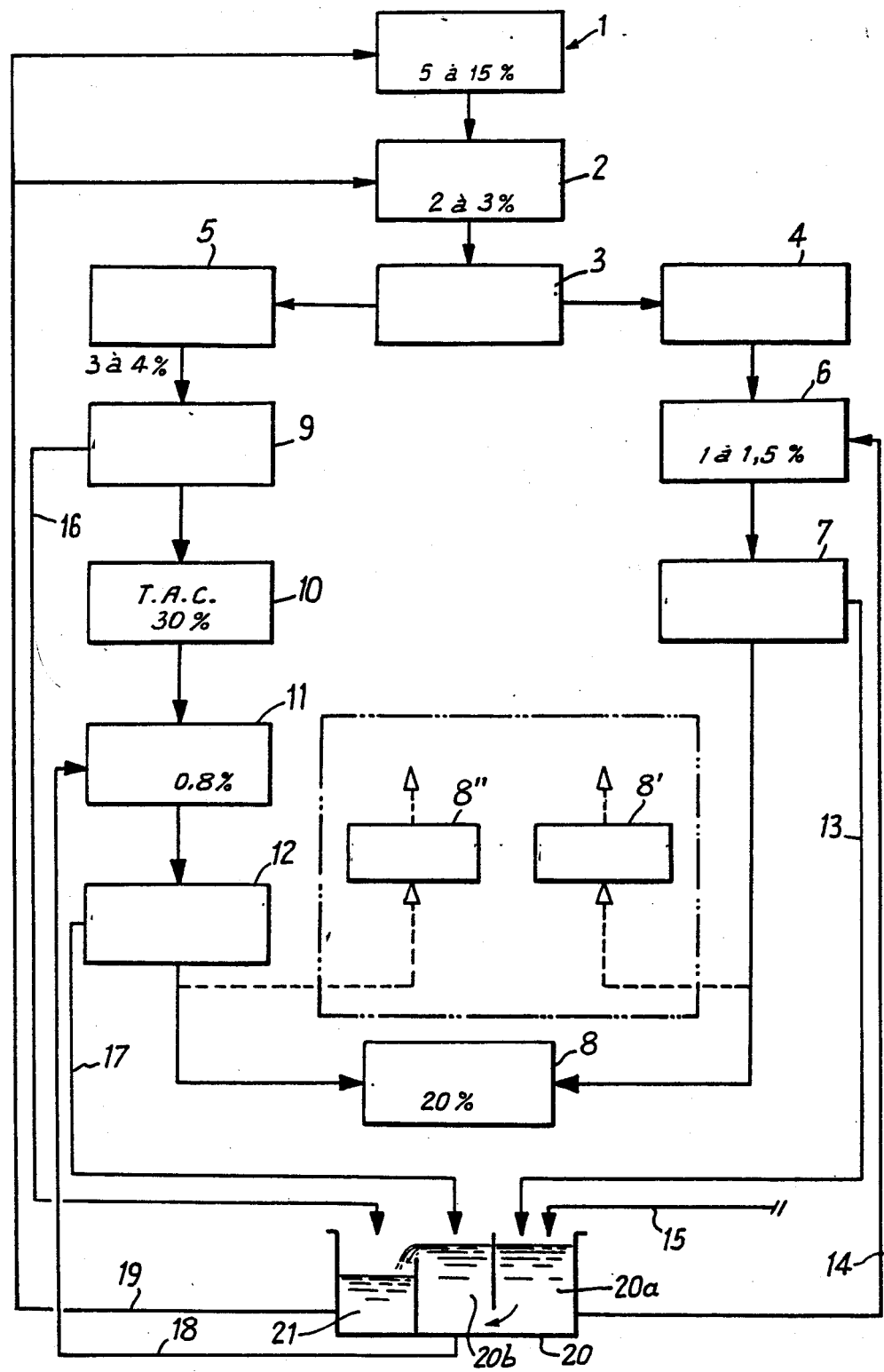

APPARATUS FOR TREATMENT OF OLD PRINTED PAPERS WITH SHORT AND LONG FIBER SEPARATION

The present invention relates to the treatment of old (used) papers including printed papers with a view to obtaining a white paper paste (pulp) of superior quality, especially for printing.

The recovery and re-use of old papers take a more and more important place in the manufacture of paper and cardboard. The making of white paper paste from old printed papers follows in general to the following successive treatments:

A pulping where the paper is disintegrated into paste;

a pre-purification phase which eliminates (removes) most of the contaminants other than ink, especially the contaminants of large dimensions, whether divided or not (for example: string, staples, plastic sheets, the most dense comtaminants (by centrifugation);

a de-inking, to remove the ink originating from the printing of the papers. This de-inking is generally carried out in two ways, either by flotation or by washing. These treatments are complementary to obtain good results;

a phase of fine purification which eliminates nearly all of the residual contaminants;

a phase of dispersion of the contaminants which are still present and which adhere to the fibers; these are generally inks, waxes, hot-melts, glues, polyethylenes etc.... One disperses these contaminants by a hot treatment comprising a thickening of the paste, to bring it to a concentration comprised between 30 and 46%, followed by a hot trituration, imposing on the pulp friction stresses at a temperature comprises between 80° C. and 100° C., which totally disperses or softens the contaminants with a view to their subsequent elimination, and favors their agglomeration (thermo-fusible binders, notably glues);

the paste obtained then undergoes a possible bleaching treatment, and then it is stored awaiting subsequent utilization.

Of course, depending on the quality of the paper required, each of these steps can be more or less developed, and some are not always necessary; notably the hot dispersion and the bleaching.

The results of such a treatment chain are rather good (one obtains a degree of whiteness of the paste permitting re-use thereof to manufacture grades identical to those of the treated papers), but the treatments consume very large quantities of water and energy, notably flotation (high rate of flow, low concentration in dry matter); the fine purification often carried out by hydrocyclones and the hot dispersion require large investments; besides, these treatments are major sources of pollution by reason mainly of the large quantities of rejected polluted water. And these drawbacks cause loss of interest in the reutilization of old printed papers for making the white paste.

On the other hand, in the paper industry it is known that one can cause the paste, composed of cellulose fibers, to undergo a fractionation prior to their refining, this fractionation dividing the paste into two parts, one containing long fibers, the other short fibers.

This technique of fractionation has been used for the purpose of separately refining the short fibers and the long fibers, the latter requiring a much stronger refining work than the former. In fact the energy gains obtained are not very significant.

Such a fractionation has no raison d'etre, in the domain of the recovery of old papers, the fibers of which have already been the subject of a refining; however, this technique of fractionation is sometimes used in the final phase of bleaching. Actually the long fibers often need a bleaching different from that of short fibers when these short fibers consist mainly of mechanical pulp, sometimes even the short fibers do not undergo any. It is then necessary to treat only the portion of the fibers of interest. The fractionation is carried out after the de-inking and fine purification for the purpose of applying specific bleaching treatments for each fraction of fibers already de-inked and purified.

In this process, each fraction of fibers undergoes generally after the fractionation a "thickening/washing" which brings the paste to concentrations comprised between 12 and 20% by volume of dry matter.

The fractionation before bleaching is interesting to the extent that it permits improving substantially the whiteness of the paste by acting on a small fraction thereof, above all when a hot treatment is necessary, the latter tending to lower the degree of whiteness of the paste. On the other hand, it does not permit making substantial savings of energy consumption or investments.

- The present invention has as its objective to make economies of investments, of energy and water consumption, while obtaining a paste of superior quality, susceptible notably of permitting its re-use for the manufacture of high quality paper grades.

It has as its object a process of treating old papers of the type including phases of pulping, of pre-purification, a fractionation of the paste into long fibers and into short fibers, a de-inking by flotation and a thickening of the fraction of short fibers, a fine purification and a thickening of the fraction of long fibers, characterized in that the fraction of long fibers undergoes at least one thickening/washing and in that the thickening waters are re-used in the treatment chain by recycling in order to reduce both the volume of rejected water, the pollution, and the consumption of water.

The invention is further distinguished by the following characteristics:

the thickening waters of the fraction of short fibers are preferentially re-used in the de-inking treatment and the surplus is recycled in the fine purification;

the waters of the thickening/washing of the fraction of long fibers are preferentially recycled in the fine purification as a complement of the surplus of the thickening waters of the fraction of short fibers, and the surplus is recycled upstream of the fractionation;

the fraction of long fibers undergoes, before the fine purification, a hot treatment comprising a thickening and a hot trituration in known thickening and triturating apparatus;

the waters of the thickening of the fraction of long fibers are recycled before the fractionation in the pulping and the prepurification;

the surplus of the waters of the thickening/washing is mixed to the waters of the thickening which precedes the hot trituration;

means are provided to regulate the concentrations of the fraction of short fibers to about 1 to 1.5% by volume for the de-inking by flotation, and to about 20% at exit from the following thickening, and the concentrations of the fraction of long fibers to about 30% at exit from the first thickening (before trituration), between 0.5 and 1% in the fine purification, and of the order of 20% at exit from the thickener/washer.

The invention also has as its object the installation for treatment of old papers to carry out the process defined before, of the type including apparatus of pulping, of pre-purification, of fractionation of the paste into short fibers and into long fibers, of de-inking by flotation, of fine purification and of thickening, characterized in that it includes a thickening/washing apparatus for the fraction of long fibers, at least one reservoir for receiving the thickening waters and return conduits of the thickening waters into the treatment chain according to the preceding definition.

The invention is further distinguished by the fact that the installation includes:

a recycling conduit of the thickening waters of the fraction of long fibers upstream of the fractionation apparatus in the pulping and prepurification apparatus;

a conduit for re-using preferentially the thickening waters of the fraction of short fibers in the de-inking apparatus and a conduit for re-using preferentially the thickening/washing waters of the fraction of long fibers and the surplus of the thickening waters in the fine purification apparatus;

between the fractionation apparatus and the fine purification apparatuses, in that order, a thickening apparatus and a hot triturator, known per se, for hot treatment of the paste and an evacuation conduit of the thickening waters feeding a reservoir;

a basin for the recovery of the thickening waters of the fraction of short fibers, of the thickening/washing waters of the fraction of long fibers, and fed with clean water for the starting of the installation, a basin for the recovery of the thickening waters of the fraction of long fibers, and in that the basins and (sic) communicate in such a way that the overflow of the basin empties into the basin.

Preferably, the concentrations by volume for such a functioning are of the order of:

short fibers: 1 to 1.5% in the de-inking apparatus, 20% at exit from the thickener;

long fibers: 30% in the trituration apparatus, 0.5 to 1% in the fine purification apparatus, 20% at exit from the thickening/washing.

BRIEF DESCRIPTION OF THE DRAWING

By way of example of realization and to better understand the invention, there is represented in the annexed drawing a scheme of a treatment chain of old papers according to the invention.

A first part of the treatment consists in transforming a volume of old printed papers into a fluid volume of fibers, freed of the voluminous (bulky) contaminants: strings, plastic, staples, etc. This transformation is carried out by a pulper 1 in which the paper, mixed with the water, is disintegrated into separate fibers.

The paste is then, in a pre-purification phase 2, freed from the principal contaminants: notably the contaminants of large dimensions, divided or not divided by the pulping, and the contaminants of high density, the latter being separated preferably by centrifugation.

Pulping and pre-purification are carried out in apparatus of known type.

What is important in the sense of the invention is that the paste, at exit from this first part(,) should not contain any contaminant of large dimensions. The paste undergoes a fractionation 3 in an apparatus which separates the short fibers 4 from the long fibers 5. The fractionation is obtained by a very fine screening in order that the portion of paste which traverses the screen will no longer contain long fibers, which are stopped by the screen and constitute the fraction of long fibers.

This operation, essentially, causes not only a fractionation 3 according to the length of the fibers, but also a very selective purification, in the sense that the short fiber fraction accepted by the screen is freed of all contaminants which, not eliminated in the pre-purification 2, are present in the refused fraction, that is, the long fiber fraction.

On the other hand, the ink contained in the paste before the fractionation, being composed of very fine pigments, has mostly a tendency to follow the short fibers. Thus at exit from the fractionation 3, the short fiber fraction 4 includes essentially short fibers, inks, charges and very fine particles, and the long fraction 5 includes long fibers, a small quantity of ink adhering to the fibers, adhesives, plastics, medium bulky particles, and charges.

Each fraction of the paste can thus be treated specifically. Very generally the fraction 4 of short fibers is sufficiently clean, that is , freed from impurities, so as not to need fine purification any more, or hot treatment, and it is on the fraction 5 of long fibers that one must concentrate these two heavy means of decontamination.

The fraction 4 of short fibers is sent into an apparatus of de-inking by flotation 6 to eliminate the pigments present in the suspension. The technique of de-inking by flotation is preferred as it permits eliminating nearly all the hydrophobic particles (inks or others) without losing fibers, whereas washing entails a loss of the fine elements, of the charges, and of the short fibers.

At exit from the de-inking 6 by flotation, the paste is clean and can be conducted into a thickener to be concentrated. The paste is in effect de-inked to low concentration, of the order of 1 to 1.5%, and it is necessary to reduce this volume for storage. The paste obtained by this thickening can then either be stored directly, or, depending on the degree of whiteness desired, be subjected to a bleaching 8'.

The water extracted from the thickeners 7 is conveyed into a basin 20a and its cleanness permits recirculating it 14 preferentially in the apparatus 6 for de-inking by flotation.

On the other side of the chain, the fraction 6 of long fibers undergoes, in the example of realization of FIG. 1, a hot treatment 9, 10(,) a fine purification 11 and a thickening/washing 12.

As has been said, the hot treatment results in detaching the contaminants adhering on the fibers, under the effect of an intense friction fiber on fiber. The temperature rise favors the softening and the agglomeration of certain contaminants(,) notably the thermo-fusible materials. The hot treatment includes two stages:

A thickening 5 bringing the paste to concentrations of the order of 30 to 40% by volume of dry matter, a trituration 10, these two stages are carried out in thickener and triturator units of known types.

The water 16 extracted from the thickening 9 of the fraction 5 of long fibers which contains a small quantity of ink is thrown back into a basin 21 and recycled 19 in (or into) the first part of the chain 1, 2 upstream of the fractionation.

The paste, after dispersion of the contaminants and of the inks in the trituration apparatus, is purified finely 11, the purification water 18 being taken from a collecting basin 20b of the thickening waters. This treatment, effected in a series of fine-purifiers of a type known per se, eliminates the particles rejected at the time of the fractionation 3 as well as the adhesives and other adhesive agglomerated contaminants from the trituration. The dilution necessary at (or for) this purification acts the more favorably as it lowers the temperature of the paste and hardens the new agglomerated particles, which are thus more easily removed.

At exit from the fine purification units 11, the paste contains practdically only long fibers, and also some dispersed inks. It then undergoes a thickening/washing 12, in an apparatus of known type; the purpose of this stage is:

to wash the paste, this washing removing the inks dispersed by the trituration, and the few short fibers and very fine particles still present;

to concentrate the paste, which one can store as such, or send to a possible bleaching stage.

The water 17 extracted from the thickening/washing 12 is thrown back in(to) a basin 20b where it becomes mixed with the surplus of the water of the thickening 7 of the short fiber fraction. The water 17 is thus recycled preferentially in the fine purification 11, the excess being recycled upstream of the fractionation 3, with the water of the possible thickening 9.

The small quantity of ink entrained with the fraction of long fibers follows the water extracted by the two successive thickenings 9, 12 existing on this fraction 5 and the greater portion of which is in fact reinjected 19 before the fractionation 3. It follows that the large portion of this ink, following the fraction of short fibers(,) is eliminated by flotation. The fraction 5 is thus de-inked by washing 12 and the ink of the filtrate is further (or subsequently) floated.

According to a variant of realization, the treatment of the fraction 5 of long fibers can be simplified or modified. In fact, depending on the quality of the old papers, it may be superfluous to practice a hot dispersion 10, or else for other reasons, it may be preferable to practice the fine purification before the heat treatment 10.

What's important for this long fiber fraction 5 in the context of this invention is that the hot trituration 10 either preceded by a thickening 9, and that the fine purification 11, necessary for the cleaning of the refusals of fractionation 3, or followed by a thickening/washing 12, and that the water or waters of thickening of the long fiber fraction are recirculated before the fractionation 3.

Besides, the annexed figure represents separate bleachings 8', 8". It is quite evident that the pastes can be either bleached together 8, or bleached separately and stored separately, or even stored together.

The supply and circulation circuit of the treatment waters provides a maximum reutilization of these said waters.

At least two basins 20 and 21 are provided, the overflow of basin 20 running out into the basin 21. The basin 20 is preferably divided into two portions 20a and 20b communicating with one another.

The basin 20a is fed by the water 13 of the thickening 7 of the short fibers, and by the pure outside water 15 permitting to start up the installation and to make the replenishment in proportion to the extraction of the good paste. The water of this basin is clean enough to feed the de-inking by flotation 6.

The basin 20b is fed by the water 17 of the thickening of the long fibers and the water coming from the basin 20a; it feeds 18 preferentially the treatment of fine purification, and by its overflow, the basin 21.

The basin 21 is fed by the overflow of the basin 20b and by the water of the first thickening 9 of the fraction 5 of long fibers. This water is recycled before the fractionation 3 in the pulping 1 and in the pre-purification 2.

One sees therefore that this treatment process constantly recirculates the entire water used with a single arrival of outside water 15.

The treatment process with recirculation of the waters, combined at determined concentrations of paste(,) permits obtaining a low consumption of outside water.

By way of example(,) the concentrations given in percentage by volume of dry matter are the following:

the pulping 5 to 15%
the pre-purification 2 to 3%
the flotation 1 to 1.5%
the thickened paste after de-inking by flotation 20%
the fraction of long fibers at exit from the fractionation 3 to 4%
the hot trituration 30%
the fine purification 0.5 to 1%
the thickened paste after purification 20%

And for this example, the test results give the following orders of magnitude of consumption of water:

For a quantity of paste produced of about 7.5 T/h the volumes of water in circulation are approximately:

| | |
|---|---|
| Outside supply | 80 m3/h = 8% |
| Thickening | 420 m3/h = 42% |
| Thickening | 500 m3/h = 50% |
| | TOTAL: 1000 m3/h |

The results show that for a quantity of 1000 m3/h of water needed to obtain, by the known methods, 7.5 T/h of good paste concentrated to 20%, the process requires only about 80 m3/h of outside water or about 8% of the total need, hence a considerable economy over the actual (real) water requirement, and a reduction of about 90% of the rejects of polluted water.

The advantages contributed by this process are numerous and important:

the fact of fractionating before the de-inking by flotation lets the flotation, the dispersion and the purification intervene only on a fraction of the production. As the fraction of short fibers often represents more than half the tonnage produced, the saving is more than 50% of the investments and of the energy corresponding to these treatments;

as the flotation acts only on a fraction of paste, proportionally very rich in ink, it is more efficient. Furthermore, as the de-inking is effected by flotation on short fibers, the loss in long fibers, which tend to float easily, is avoided. As the content of long fibers is an important factor in the quality of the paper, this advantage is considerable;

the treatments of thickenings of the fraction of long fibers are easier due to the fact that these fibers retain less water;

as the washing operation is performed only on the fraction of long fibers presents (sic) a minimum loss of short fibers;

the circulation of the water reduces the consumption, and very substantially the pollution.

I claim:

1. Apparatus for the treatment of old papers including means for pulping, means for pre-purification, means for fractionation of a resulting paste into short fibers and long fibers, means for de-inking by flotation the short fibers, means for fine purification of the long fibers, the apparatus further comprising:

means for thickening/washing the fraction of long fibers, said means utilizing at least one reservoir to receive thickening waters and ink from the long fibers; and first return conduit means for recycling the thickening waters and ink from the long fibers upstream of the means for fractionation, to the means for pulping and to the means for pre-purification, the at least one reservoir including a first reservoir for the recovery of the thickening waters from the fraction of short fibers, and from the thickening/washing waters of the fraction of long fibers, the first reservoir containing pure water for the starting of the apparatus, and a second reservoir in fluid communication with the first reservoir such that the overflow of the first reservoir empties into the second reservoir.

2. The apparatus of claim 1, further comprising means for thickening of the short fiber fraction and second conduit means for recycling waters from the means for thickening of the short fiber fraction to the means for de-inking; and, a third conduit for recycling the waters from the means for de-inking, and from the means for thickening/washing of the long fiber fraction, to the means for fine purification.

3. The apparatus of claim 1, further comprising
  a thickening apparatus and a hot triturator, disposed between the means for fractionation and the means for fine purification, the means for thickening/washing being disposed after the means for fine purification, the thickening apparatus and the hot triturator treating the long fibers, and a conduit provided for transferring waters from the thickening apparatus to the second reservoir.

* * * * *